3,227,568
REFRACTORY BRICK
Donald F. Stock, Pittsburgh, Berhl E. Wishon, Bethel Park, and J. Allen Pierce, Pittsburgh, Pa., assignors to Harbison-Walker Refractories Company, Pittsburgh, Pa., a corporation of Pennsylvania
No Drawing. Filed Feb. 6, 1964, Ser. No. 343,131
8 Claims. (Cl. 106—67)

The present invention relates to refractory brick and, more particularly, to improved semi-silica fireclay brick. Semi-silica fireclay brick is defined by the ASTM as fireclay brick with not less that 72% silica. They are required to have a modulus of rupture of 300 p.s.i. minimum, and a load test subsidence in 90 minutes, at 2460° F. of not over 1.5% with an applied load of 25 p.s.i. While there is no specific upper limit on the silica inclusion, those skilled in the art consider it to be about 80%.

Semi-silica brick are recognized for certain excellent characteristics, among which are their ability to withstand soaking heats under load and attack by alkalies.

However, as metallurgical processes have undertaken operations at considerably higher temperatures, their limit of usefulness must be improved. While adequate at lower temperatures, their lack of high temperature strength and spalling resistance has become an increasing problem. One example in which higher temperatures have caused difficulty with previously available semi-silica brick is in the blast furnace stove.

Of the various types of semi-silica brick previously available, "Jersey Clay Brick" is notable as one economically made from naturally-occurring siliceous clays. However, these brick lack the desired spalling resistance and strength for the higher temperatures now needed in industry. Where siliceous clays are not available, some workers have made a synthetic semi-silica brick by combining clays of low silica content with fine pure sand or other forms of high purity quartz, to achieve a product equivalent in final silica content to other semi-silica brick. Such semi-silica brick were superior to the Jersey clay brick, but their tendency for slow permanent expansion or growth at the increased temperatures of modern metallurgical operations, particularly in the steel industry, prevents their full use.

Accordingly, it is an object of this invention to provide improved semi-silica brick having increased mechanical strength and high temperature spalling resistance.

Another object of the invention is to provide improved semi-silica brick, using relatively inexpensive and commercially available raw materials.

Briefly, in one embodiment, improved semi-silica brick according to the concepts of this invention are fabricated with from 70 to 90% of a mixture of crude and calcined siliceous clay, from about 5 to 20% of a bond clay such as ball clay, and from about 5 to 20% of relatively coarse kaolinitic clay having different thermal expansion characteristics than the siliceous clay.

Previous commercially available semi-silica brick, made of siliceous clays, had certain outstanding properties which became greatly limited at higher temperatures. The addition of less siliceous plastic clays appeared to provide some improvement in mechanical strength, but not without some small loss of refractoriness. This appeared satisfactory for furnaces operated at low temperatures but, with the increased output which present technology demands, each additional degree of refractoriness that can be obtained in semi-silica brick is important; and the loss of refractoriness attending plastic clay additions is no longer acceptable for contemporary higher operating temperatures.

It has been discovered that the addition of a calcined kaolinitic clay, having different thermal expansion characteristics than the siliceous clay, provided improved spalling resistance at higher temperatures without sacrifice of any of the other desirable properties for a semi-silica brick. The coefficient of thermal expansion of the siliceous clays is approximately $5 \times 10^{-6}/°$ F. and higher while the same for the kaolinitic clays employed in accordance with the invention is less than $2.5 \times 10^{-6}/°$ F.

This difference in expansion characteristics is important. When a typical siliceous batch is formed into brick and burned, the grains are in close contact and form a dense, uniform unit. When the resulting brick is heated in service, all grains would expand and contract at the same rate if the grains had similar expansion characteristics. With no interior freedom of movement, the tendency would be greater for spalling. Conversely, the use of differently expanding grains within the mix would allow some freedom of movement within the brick, thereby, reducing the spalling tendency.

The bond clay employed may be selected from anyone of those well known in the industry, such as M & D and Jackson ball clays, and locally available plastic clays. The determining factor in the selection of a bond clay is that it must be of low enough alkali content so as not to increase the total alkali content of the mix to above about 0.25% when a sufficient amount is added for strength. Of the many kaolinitic clays available calcined Alabama kaolin, calcined Pa. kaolin, calcined Pa. hard clays and crude Pa. hard clays have been found to be particularly satisfactory.

Seven mixes (B, C, D, E, F, G and H) were made in accordance with the invention. Mix A was a control mix made in the same manner, but without the addition of a calcined kaolinitic clay. All mixes used water as a tempering fluid. Brick were formed from the mixes and burned to cone 15 (2,550° F.) in a laboratory periodic kiln.

Table I

| Mix: | A | B | C | D | E | F | G | H |
|---|---|---|---|---|---|---|---|---|
| Calcined Siliceous Clay, percent | 40 | 30 | 20 | 30 | 25 | 30 | 25 | 25 |
| Crude Siliceous Clay, percent | 50 | 50 | 50 | 50 | 50 | 50 | 50 | 50 |
| Calcined Alabama Kaolin, percent | | 10 | 20 | | | | | |
| Jackson Ball Clay, Air Floated, percent | 10 | 10 | 10 | 10 | 10 | 10 | 10 | 10 |
| Calcined Pa. Kaolin, percent | | | | 10 | 15 | | | |
| Calcined Pa. Hard Clay, percent | | | | | | 10 | 15 | |
| Crude Pa. Hard Clay, percent | | | | | | | | 15 |
| Calculated SiO$_2$ Content (percent) | 76.2 | 73.6 | 71.0 | 73.7 | 72.3 | 73.5 | 72.0 | 72.0 |
| Linear Change in Burning to Cone 15 (percent) | +0.1 | −0.1 | −0.1 | −0.6 | +0.2 | −0.6 | −0.4 | −0.9 |
| Bulk Density, p.c.f. (Av. 17) | 121 | 125 | 128 | 125 | 123 | 125 | 124 | 124 |
| Modulus of Rupture, p.s.i. at Room Temperature (Av. 5) | 440 | 600 | 660 | 420 | 520 | 460 | 690 | 450 |
| Apparent Porosity, percent, (Av. 5) | 26.8 | 25.3 | 23.8 | 25.7 | 25.3 | 25.5 | 24.9 | 25.4 |
| Apparent Specific Gravity (Av. 5) | 2.64 | 2.65 | 2.66 | 2.66 | 2.64 | 2.66 | 2.62 | 2.64 |
| Percent Loss in Panel Spalling Test with Preheat at 2,750° F. (1,510° C.) (Av. 7) | 15.5 | 4.9 | 0.0 | 10.2 | 4.0 | 0.0 | 0.0 | 0.6 |
| Load Test, 25 p.s.i. (Av. 2) Linear Subsidence at 2,640° F. (percent) | 0.9 | 1.0 | 0.9 | 0.7 | 0.2 | 1.3 | 0.8 | 0.8 |
| Tempering Water (percent) | 7.7 | 7.5 | 7.3 | 7.0 | 7.0 | 7.5 | 7.5 | 7.5 |

Tests on such brick indicated that higher density, increased mechanical strength and lower porosity resulted from the addition of a kaolinitic clay to the mixture of siliceous fireclay material. Spalling resistance tests were also conducted and indicated considerable improvement over semi-silica brick made without the addition of a kaolinitic clay. The above table sets forth, in condensed form, the results of laboratory tests.

What is particularly remarkable about the above laboratory test results, is the dramatic reduction in spalling loss after a 2,750° F. preheat. Also of significance is the noticeable increase in the modulus of rupture of many of the mixes. The load test subsidence is also below the maximum acceptable ASTM standard.

Table II is a screen analysis of the mixtures A through H of Table I.

Table II

[In percent]

| Mix: | A | B | C | D | E | F | G | H |
|---|---|---|---|---|---|---|---|---|
| Screen Analysis Held on— | | | | | | | | |
| 6 mesh | | | | | | | | |
| 8 mesh | | TR | TR | | | | | |
| 10 mesh | TR | 1 | 1 | 1 | 1 | 1 | | 2 |
| 14 mesh | 3 | 1 | 2 | 1 | 2 | 1 | 2 | 3 |
| 20 mesh | 4 | 3 | 4 | 3 | 3 | 2 | 3 | 3 |
| 28 mesh | 5 | 5 | 6 | 4 | 3 | 3 | 3 | 3 |
| 35 mesh | 5 | 6 | 7 | 3 | 4 | 4 | 3 | 2 |
| 48 mesh | 8 | 6 | 5 | 5 | 5 | 5 | 6 | 5 |
| 65 mesh | 12 | 7 | 8 | 8 | 8 | 8 | 10 | 7 |
| 100 mesh | 8 | 11 | 10 | 13 | 14 | 14 | 15 | 13 |
| 150 mesh | 5 | 2 | 1 | 11 | 10 | 12 | 10 | 10 |
| Pass 150 mesh | 50 | 10 | 9 | 5 | 3 | 3 | 3 | 4 |
| | | 48 | 47 | 46 | 46 | 46 | 43 | 48 |

The crude siliceous clay used in Mixes A through H was −4 mesh, as received from the mine. The calcined siliceous clay was all −10 mesh, and the kaolinitic clays were all −6 mesh. The relative amounts of calcined clay and crude clay, which were combined with a bonding clay and with a kaolinitic clay, were such as to result in the screen analysis of Table II.

Detailing the manufacture of the brick of Table I: The materials were combined in the proportions listed, and mixed together in a Clearfield mixer for about 5 minutes dry and about 10 minutes wet. Table I also lists the amounts of tempering water added for each mix.

The forming pressure for the brick was 4,000 p.s.i. The brick were placed in a laboratory kiln, subjected to a 50° F. per hour firing schedule to about 2,550° F. (cone 15) and held for 10 hours once this temperature was obtained. The brick were well filled out, strong and free from pressure cracks, thereby providing good comparative test specimens.

The following table sets forth, on an oxide basis, a typical analysis of the materials used in Mixes A through H of Table I.

strength and thermal shock or spalling resistance, and subjecting the user to very serious problems of expansion as the quartz progressively converts to high temperature crystalline forms. Also, it is important that the kaolinitic clays added to the siliceous clays be of a different thermal coefficient of expansion than the siliceous clays, in order that the increased strength and spalling resistance can be attained.

Further, the alkali content of the brick should be very low, preferably less than about 0.25%, by weight.

Although water is the normal tempering agent for preparing the brick batch for the press, it is sometimes advisable to modify its action by the methods well known to those who make refractory brick. Concentrated sulfite waste liquor may be used in complete or partial replacement of the water. Likewise, the action of the water may be altered by control of its pH, as is common knowledge. Alkaline additions, such as small amounts of sodium hydroxide, may be used; or, conversely, small amounts of acids or acid salts may be used with the water. In this group are included aluminum sulfate, sulfuric acid, ferric chloride or others.

As in the manufacture of all burned refractories, the burning process is utilized to accomplish mineral alterations, and to give the product a permanent ceramic bond, so that its strength would be adequate for shipment and use without breakage. In the example given, the burning temperature was 2,550° F. (cone 15), this usually being preferred for those particular compositions. Somewhat lower or higher temperatures would alter the properties without destroying the usefulness of our invention. It is regarded that 2,350 to 2,700° F. is about the extent of the useful firing range.

While the invention has been described with regard to specific embodiments, it should be understood, of course, that modifications, substitutions and the like may be made therein without departing from its scope.

We claim:

1. A refractory batch for making improved ceramically bonded semi-silica brick consisting essentially of, by weight, from 70 to 90% of siliceous clay from 5 to 20% of bond clay and from about 5 to 20% of a kaolinitic clay, said siliceous clay being characterized by having a thermal coefficient of expansion of at least about $5 \times 10^{-6}/°$ F. and said kaolinitic clay being characterized by having a thermal coefficient of expansion of less than about $2.5 \times 10^{-6}/°$ F.

2. The batch of claim 1 made from a batch in which the kaolinitic clay is all about −6 mesh.

3. The batch of claim 1 in which the siliceous clay is a mixture of a minor portion of a calcined clay and a major portion of a crude clay.

4. A refractory batch for making improved ceramically bonded semi-silica brick consisting essentially of, by

Table III

[In Percent]

| | Crude Siliceous Clay | Calcined Siliceous Clay | Bond Clay | Calcined Alabama Kaolin | Calcined PA Kaolin | Calcined PA Hard | Crude PA Hard |
|---|---|---|---|---|---|---|---|
| Silica (SiO$_2$) | 72.2 | 77.7 | 54.0 | 52.0 | 59.7 | 51.0 | 44.5 |
| Alumina (Al$_2$O$_3$) | 19.0 | 20.4 | 30.1 | 44.9 | 36.8 | 43.8 | 38.2 |
| Titania (TiO$_2$) | 1.1 | 1.2 | 1.7 | 1.6 | 2.7 | 3.0 | 2.6 |
| Iron Oxide (Fe$_2$O$_3$) | 0.4 | 0.4 | 1.0 | 1.3 | 0.6 | 0.7 | 0.6 |
| Lime (CaO) | 0.1 | 0.1 | 0.2 | 0.1 | 0.13 | 0.2 | 0.18 |
| Magnesia (MgO) | 0.1 | 0.1 | 0.3 | 0.1 | 0.04 | 0.12 | 0.11 |
| Alkalies | 0.04 | 0.04 | 0.4 | 0.3 | 0.02 | 0.2 | 0.2 |
| Ignition Loss | 7.1 | | 12.3 | | | | 13.8 |

As was mentioned above in making semi-silica brick according to this invention, it is undesirable to add free silica as quartz in any of its forms. If such is present, it should be extremely fine (−65 mesh) or even finer (−150 mesh). Included silica of larger amounts or of a coarser nature results in brick frequently lacking weight, from 70 to 90% of a mixture of crude and calcined siliceous clay, from 5 to 20% of a bond clay, from about 5 to 20% of a kaolinitic clay, said siliceous clay being characterized by having a thermal coefficient of expansion of at least about $5 \times 10^{-6}/°$ F. and said kaolinitic clay being characterized by having a thermal coefficient of expansion of less than about $2.5\times10^{-6}/°$ F. and about from 7 to 8 parts of a tempering fluid.

5. A refractory batch for making improved ceramically bonded semi-silica brick consisting essentially of, by weight, from 70 to 90% of a mixture of calcined and crude siliceous clay, from 5 to 20% of a bond clay, said mixture being substantially free of alkalies, and from about 5 to 20% of a kaolinitic clay said siliceous clay being characterized by having a thermal coefficient of expansion of at least about $5\times10^{-6}/°$ F. and said kaolinitic clay being characterized by having a thermal coefficient of expansion of less than about $2.5\times10^{-6}/°$ F.

6. A refractory batch for making improved ceramically bonded semi-silica brick consisting essentially of, by weight, from 70 to 90% of siliceous clay, from 10 to 15% of a bond clay and from 5 to 20% of calcined Alabama kaolin, said siliceous clay being characterized by having a thermal coefficient of expansion of at least about $5\times10^{-6}/°$ F. and said Alabama kaolin being characterized by having a thermal coefficient of expansion of less than about $2.5\times10^{-6}/°$ F.

7. A refractory batch for making improved ceramically bonded semi-silica brick consisting essentially of, by weight, from 70 to 90% of siliceous clay, in which said clay is a mixture of a minor proportion of calcined siliceous clay and a major proportion of crude siliceous clay, from 5 to 20% of a ball clay and from 5 to 20% of calcined Alabama kaolin, said siliceous clay being characterized by having a thermal coefficient of expansion of at least about $5\times10^{-6}/°$ F. and said Alabama kaolin being characterized by having a thermal coefficient of expansion of less than about $2.5\times10^{-6}/°$ F.

8. A refractory batch for making improved ceramically bonded semi-silica brick consisting essentially of, by weight, from about 20 to 40% of calcined siliceous clay, and about 40 to 60% of crude siliceous clay, about 5 to 20% of a ball clay, from 10 to 20% of calcined Alabama kaolin, and about 7.5% of a tempering fluid, said siliceous clay being characterized by having a thermal coefficient of expansion of at least about $5\times10^{-6}/°$ F. and said Alabama kaolin being characterized by having a thermal coefficient of expansion of less than about $2.5\times10^{-6}/°$ F.

References Cited by the Examiner
UNITED STATES PATENTS

| 2,990,289 | 6/1961 | Lambie | 106—69 |
| 3,026,212 | 3/1962 | Fay et al. | 106—69 |

TOBIAS E. LEVOW, *Primary Examiner.*

J. POER, *Assistant Examiner.*